United States Patent
Satsuma et al.

(10) Patent No.: US 9,630,112 B2
(45) Date of Patent: Apr. 25, 2017

(54) SERVER DEVICE, AND NON-TRANSITORY COMPUTER-READABLE STORAGE MEDIUM STORING GAME PROGRAM

(71) Applicant: DeNA Co., Ltd., Tokyo (JP)

(72) Inventors: Sadaaki Satsuma, Tokyo (JP); Akihiro Suga, Tokyo (JP); Keisuke Kamiyama, Tokyo (JP); Satoshi Kagami, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 411 days.

(21) Appl. No.: 14/180,244

(22) Filed: Feb. 13, 2014

(65) Prior Publication Data
US 2015/0011319 A1    Jan. 8, 2015

(30) Foreign Application Priority Data

Jul. 2, 2013 (JP) .................................. 2013-138844

(51) Int. Cl.
A63F 13/30 (2014.01)
A63F 13/69 (2014.01)
A63F 13/35 (2014.01)

(52) U.S. Cl.
CPC .............. *A63F 13/69* (2014.09); *A63F 13/35* (2014.09)

(58) Field of Classification Search
CPC ........... A63F 13/69; A63F 13/35; A63F 13/12
USPC ........................................................ 463/42
See application file for complete search history.

(56) References Cited

U.S. PATENT DOCUMENTS

| | | | | |
|---|---|---|---|---|
| 6,993,500 B2 * | 1/2006 | Ishihara | ............... | G06Q 10/087 463/22 |
| 8,708,817 B1 * | 4/2014 | de la Carcova | ...... | A63F 13/211 463/16 |
| 8,790,185 B1 * | 7/2014 | Caldarone | ............... | A63F 13/10 463/39 |

(Continued)

FOREIGN PATENT DOCUMENTS

JP    5086491 B    9/2012

OTHER PUBLICATIONS

Kinetic, https://www.youtube.com/watch?v=SXnUYdDoylo, published Jan. 28, 2013.*

(Continued)

*Primary Examiner* — Michael Cuff
(74) *Attorney, Agent, or Firm* — Procopio, Cory, Hargreaves & Savitch LLP

(57) ABSTRACT

A server device determines: win/loss of a battle game in response to a battle request from a player terminal; a provisional game content when it is determined that a player wins the battle game; win/loss of a successive battle game succeeding the battle game in response to a successive battle request from the player terminal after determining the provisional game content; and a game content, to which rarity higher than or identical to the provisional game content is set, to be provisional game content after change when determined that the player wins the successive battle game; and allows the player to own the provisional game content when accepting an acquisition request from the player terminal after determining the provisional game content, and allows the player to own the provisional game content after change when accepting an acquisition request from the player terminal after determining the provisional game content after change.

10 Claims, 15 Drawing Sheets

(56) References Cited

U.S. PATENT DOCUMENTS

| | | | | |
|---|---|---|---|---|
| 2001/0039206 A1* | 11/2001 | Peppel | .................... | A63F 9/24 |
| | | | | 463/31 |
| 2008/0023913 A1* | 1/2008 | Barthold | ................. | A63F 3/00 |
| | | | | 273/241 |
| 2009/0023487 A1* | 1/2009 | Gilson | .................... | A63F 1/00 |
| | | | | 463/11 |
| 2010/0003649 A1* | 1/2010 | Ferguson | ................. | A63F 3/04 |
| | | | | 434/167 |
| 2013/0225259 A1* | 8/2013 | Kojo | ..................... | A63F 13/12 |
| | | | | 463/22 |
| 2013/0252689 A1* | 9/2013 | Nashida | ............... | G07F 17/329 |
| | | | | 463/17 |
| 2013/0316835 A1* | 11/2013 | Takagi | ................... | A63F 13/12 |
| | | | | 463/42 |
| 2013/0337906 A1* | 12/2013 | Ikeda | .................... | A63F 13/00 |
| | | | | 463/29 |
| 2014/0310243 A1* | 10/2014 | McGee | ............ | G06F 17/30575 |
| | | | | 707/639 |

OTHER PUBLICATIONS

Toto, Dr. Serkan, "Gacha: Explaining Japan's Top Money-Making Social Game Mechanism", published Feb. 21, 2012.*
Japanese Patent Application No. 2013-138844: Office Action mailed on Oct. 15, 2013.
"Jikkyou Pawafuru Puro Yakyu 2011: Wild Summer Strategy Guide", "Weekly Famitsu Combined Edition on Aug. 18 and 25, Special Supplement vol. 126", Enterbrain, Inc., Aug. 4, 2011, p. 13.

* cited by examiner

FIG. 4

| CARD ID | CHARACTER NAME | CHARACTER IMAGE | RARITY | INITIAL (Lv.1) ATTACK STRENGTH | INITIAL (Lv.1) DEFENSE STRENGTH |
|---|---|---|---|---|---|
| 0001 | WARRIOR A |  | COMMON | 15 | 8 |
| 0002 | WARRIOR A |  | UNCOMMON | 20 | 15 |
| 0003 | WARRIOR A |  | RARE | 100 | 60 |
| 0004 | WARRIOR A |  | SUPER RARE | 200 | 180 |
| 0011 | WARRIOR B |  | COMMON | 10 | 5 |
| 0012 | WARRIOR B |  | UNCOMMON | 15 | 10 |
| 0013 | WARRIOR B |  | RARE | 80 | 50 |
| ... | ... | ... | ... | ... | ... |
| 2591 | WIZARD Z |  | COMMON | 20 | 30 |
| 2592 | WIZARD Z |  | UNCOMMON | 50 | 75 |
| 2593 | WIZARD Z |  | RARE | 60 | 100 |
| 2594 | WIZARD Z |  | SUPER RARE | 150 | 300 |

FIG. 5

| ITEM ID | ITEM NAME | PRICE |
|---|---|---|
| 0001 | ITEM A | 100 |
| 0002 | ITEM B | 200 |
| 0003 | ITEM C | 300 |
| ⋮ | ⋮ | ⋮ |

FIG. 6

| PLAYER ID | VIRTUAL CURRENCY | BATTLE POINT | NUMBER OF CLEAR VICTORIES | NUMBER OF CLEAR VICTORIES KEPT | OWNED CARD INFORMATION | OWNED ITEM INFORMATION | DECK INFORMATION |
|---|---|---|---|---|---|---|---|
| 1 | 0 | 10 | 5 | 1 | OWNED CARD INFORMATION (1) | OWNED ITEM INFORMATION (1) | DECK INFORMATION (1) |
| 2 | 500 | 3 | 1 | 8 | OWNED CARD INFORMATION (2) | OWNED ITEM INFORMATION (2) | DECK INFORMATION (2) |
| 3 | 700 | 2 | 10 | 0 | OWNED CARD INFORMATION (3) | OWNED ITEM INFORMATION (3) | DECK INFORMATION (3) |
| 4 | 1000 | 5 | 9 | 2 | OWNED CARD INFORMATION (4) | OWNED ITEM INFORMATION (4) | DECK INFORMATION (4) |
| 5 | 100 | 3 | 3 | 10 | OWNED CARD INFORMATION (5) | OWNED ITEM INFORMATION (5) | DECK INFORMATION (5) |
| 6 | 3000 | 1 | 0 | 7 | OWNED CARD INFORMATION (6) | OWNED ITEM INFORMATION (6) | DECK INFORMATION (6) |
| . | . | . | . | . | . | . | . |
| . | . | . | . | . | . | . | . |
| . | . | . | . | . | . | . | . |

FIG. 7

OWNED CARD INFORMATION (3)
OWNED CARD INFORMATION (2)
OWNED CARD INFORMATION (1)

| CARD ID | ATTACK STRENGTH | DEFENSE STRENGTH | HIT POINT | ACQUIRED DATE AND TIME |
|---------|-----------------|------------------|-----------|------------------------|
| 0011 | 15 | 10 | 200 | 2012/2/13 10:00 |
| 0211 | 20 | 23 | 150 | 2012/2/13 12:00 |
| 0133 | 70 | 45 | 100 | 2012/2/14 11:30 |
| 0201 | 22 | 40 | 600 | 2012/2/15 18:00 |
| 0072 | 60 | 50 | 250 | 2012/2/16 13:30 |
| 0094 | 300 | 200 | 450 | 2012/2/16 19:00 |
| ... | ... | ... | ... | ... |

FIG. 8

OWNED ITEM INFORMATION (3)

OWNED ITEM INFORMATION (2)

OWNED ITEM INFORMATION (1)

| ITEM ID | NUMBER OF ITEMS OWNED |
|---------|-----------------------|
| 0001    | 20                    |
| 0002    | 10                    |
| 0003    | 1                     |
| ⋮       | ⋮                     |

FIG. 9

DECK INFORMATION (3)

DECK INFORMATION (2)

DECK INFORMATION (1)

| NUMBER | RARITY     | CARD ID | KEEP CARD |
|--------|------------|---------|-----------|
| 1      | COMMON     | 2011    | FALSE     |
| ⋮      | ⋮          | ⋮       | ⋮         |
| 50     | UNCOMMON   | 1003    | TRUE      |
| ⋮      | ⋮          | ⋮       | ⋮         |
| 90     | RARE       | 0823    | FALSE     |
| ⋮      | ⋮          | ⋮       | ⋮         |
| 100    | SUPER RARE | 0104    | FALSE     |

SERVER DEVICE, AND NON-TRANSITORY COMPUTER-READABLE STORAGE MEDIUM STORING GAME PROGRAM

BACKGROUND OF THE INVENTION

Field of the Invention

The present invention relates to a server device and a game program.

Description of the Related Art

There is known a game system which accepts a battle request from a player, determines win/loss of a battle game and, on the basis of the win/loss outcome of the battle game, allows the player to acquire a game content to which rarity is set (JP 5086491 B1, for example).

SUMMARY OF THE INVENTION

In such game system, the rarity of a game content acquired by the player in a next battle game is irrelevant to the rarity of the game content acquired by the player in the current battle game, meaning that the rarity is determined by drawing every time the battle game is played. As a result, the expectation of the player with regards to the acquisition of the game content has been steady even when the battle game is played repeatedly.

The present invention has been made in consideration of such circumstances. An object of the present invention is to increase the expectation of the player with regards to the acquisition of the game content every time the battle game is played.

A main aspect of the present invention to solve the aforementioned problems is a server device which is connected to a player terminal used by a player through a network, the server device including:

a storage unit which stores a plurality of game contents to which rarity is set;

a battle processing unit which determines win/loss of a battle game in response to a battle request from the player terminal;

a provisional game content determination unit which determines any of the plurality of game contents to be a provisional game content that can be acquired by the player when it is determined that the player wins the battle game;

a successive battle processing unit which determines win/loss of a successive battle game succeeding the battle game in response to a successive battle request from the player terminal after the provisional game content is determined;

a provisional game content changing unit which determines a game content, to which the rarity higher than or identical to that of the provisional game content is set from among the plurality of game contents, to be a provisional game content after change when it is determined that the player wins the successive battle game; and a game content acquisition processing unit which determines the provisional game content determined by the provisional game content determination unit to be an owned game content owned by the player when an acquisition request from the player terminal is accepted after determining the provisional game content, and determines the provisional game content after change determined by the provisional game content changing unit to be the owned game content owned by the player when an acquisition request from the player terminal is accepted after determining the provisional game content after change.

Other characteristics of the present invention will become clear from the description of the present specification and the appended drawings.

The present invention can increase the expectation of the player with regards to the acquisition of the game content every time a battle is fought.

BRIEF DESCRIPTION OF THE DRAWINGS

FIG. 4 is a diagram illustrating an example of a data structure of card information;

FIG. 5 is a diagram illustrating an example of a data structure of item information;

FIG. 6 is a diagram illustrating an example of a data structure of player information;

FIG. 7 is a diagram illustrating an example of a data structure of owned card information;

FIG. 8 is a diagram illustrating an example of a data structure of owned item information;

FIG. 9 is a diagram illustrating an example of a data structure of deck information;

DETAILED DESCRIPTION OF THE INVENTION

Figure 1:
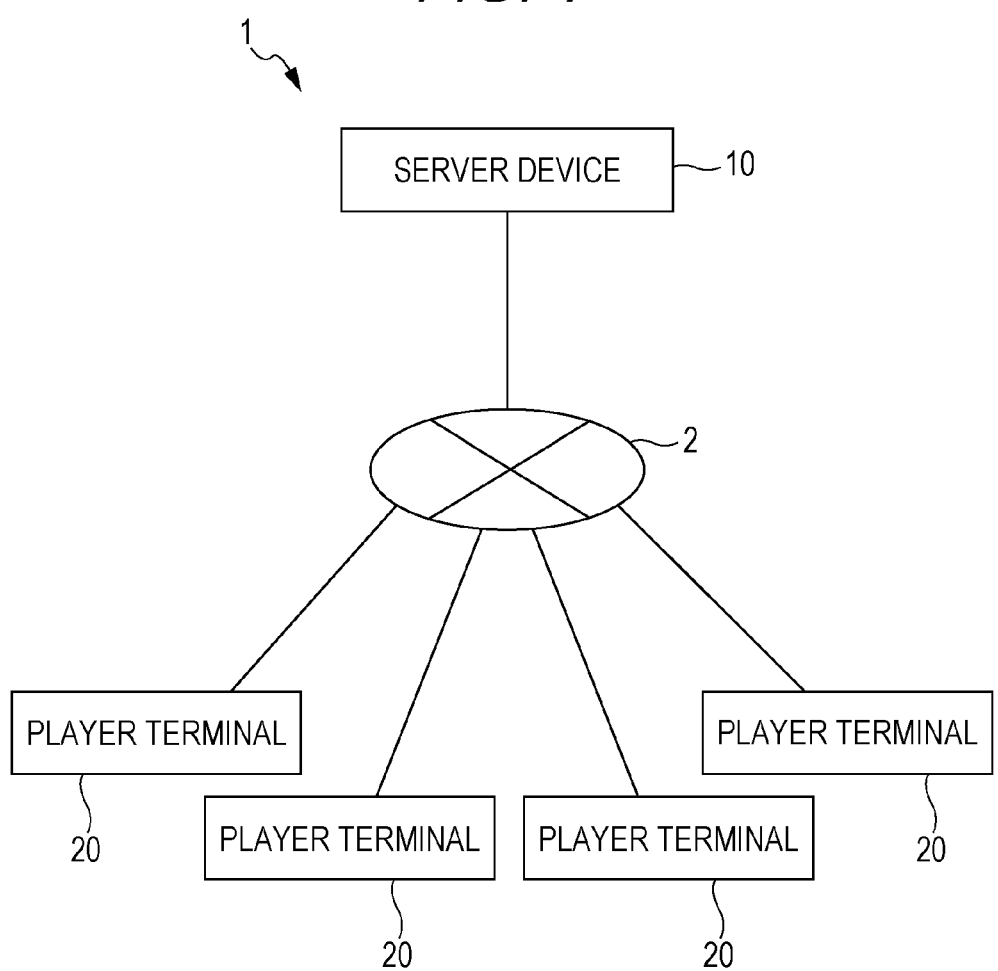
FIG. 1 is a diagram illustrating an overall configuration example of a game system.

At least the following matters will become clear according to the description of the present specification and the appended drawings.

That is, there is provided a server device which is connected to a player terminal used by a player through a network, the server device including:

a storage unit which stores a plurality of game contents to which rarity is set; a battle processing unit which determines win/loss of a battle game in response to a battle request from the player terminal;

a provisional game content determination unit which determines any of the plurality of game contents to be a provisional game content that can be acquired by the player when it is determined that the player wins the battle game;

a successive battle processing unit which determines win/loss of a successive battle game succeeding the battle game in response to a successive battle request from the player terminal after the provisional game content is determined;

a provisional game content changing unit which determines a game content, to which the rarity higher than or identical to that of the provisional game content is set from among the plurality of game contents, to be a provisional game content after change when it is determined that the player wins the successive battle game; and a game content acquisition processing unit which determines the provisional game content determined by the provisional game content determination unit to be an owned game content owned by the player when an acquisition request from the player terminal is accepted after determining the provisional game content, and determines the provisional game content after change determined by the provisional game content changing unit to be the owned game content owned by the player when an acquisition request from the player terminal is accepted after determining the provisional game content after change.

Such server device can increase the expectation of the player with regards to the acquisition of the game content every time a battle is fought.

There may also be provided a selection control unit which selectively allows the game content acquisition processing unit to determine the provisional game content after change to be the owned game content in response to an acquisition request from the player terminal or allows the successive battle processing unit to determine win/loss of the successive battle game in response to a successive battle request from the player terminal within a predetermined time limit.

The server device can thus encourage a successive battle by making the player select whether to acquire the provisional game content after change being determined or forgo acquiring the provisional game content after change to repeat the successive battle game within the limited time.

Moreover, there may be provided a count unit which counts elapsed time since the successive battle request from the player terminal is accepted and a determination unit which determines whether or not the elapsed time counted by the count unit has reached a predetermined time limit, where the game content acquisition processing unit may determine the provisional game content after change being determined by the provisional game content changing unit to be the owned game content owned by the player when the determination made by the determination unit is affirmative.

According to such server device, the player can acquire the provisional game content after change even when the time limit is reached.

There may also be provided a rewarding unit which gives a reward to the player when the successive battle processing unit determines that the player loses the successive battle game.

According to such server device, the player cannot acquire the provisional game content or the provisional game content after change but can receive a reward when it is determined that the player loses the successive battle game.

Moreover, the rewarding unit may vary the reward to be given to the player according to the rarity of the provisional game content that is determined by the provisional game content determination unit.

According to such server device, the player can receive the reward according to the rarity of the provisional game content.

There may also be provided a screen data generation unit which generates a game screen before the win/loss of the successive battle game is determined by the successive battle processing unit, the game screen including information pertaining to a game content that is possibly determined as the provisional game content after change by the provisional game content changing unit.

According to such server device, the player can more easily determine, before the win/loss of the successive battle game is determined, whether to acquire the provisional game content being determined or forgo acquiring the provisional game content and repeat the successive battle game succeeding the battle game in order to acquire the provisional game content after change, by looking at the information pertaining to the game content that is possibly determined to be the provisional game content after change.

Next, there is provided a non-transitory computer-readable storage medium storing a game program which causes a computer to execute: a process of storing, in a storage unit, a plurality of game contents to which rarity is set; a battle process of determining win/loss of a battle game in response to a battle operation from a player; a provisional game content determination process of determining any of the plurality of game contents to be a provisional game content that can be acquired by the player when it is determined that the player wins the battle game; a successive battle process of determining win/loss of a successive battle game succeeding the battle game in response to a successive battle operation from the player after the provisional game content is determined; a provisional game content changing process of determining a game content, to which the rarity higher than or identical to that of the provisional game content is set from among the plurality of game contents, to be a provisional game content after change when it is determined that the player wins the successive battle game; and a game content acquisition process of determining the provisional game content determined in the provisional game content determination process to be an owned game content owned by the player when an acquisition operation from the player is accepted is accepted after determining the provisional game content, and determining the provisional game content after change determined by the provisional game content changing process to be the owned game content owned by the player when an acquisition operation from the player is accepted after determining the provisional game content after change.

According to such non-transitory computer-readable storage medium storing a game program, the expectation of the player with regards to the acquisition of the game content can be increased every time a battle is fought.

Embodiments

<<Configuration of Game System 1>>

FIG. 1 is a diagram illustrating an example of an overall configuration of a game system 1 according to the present embodiment. The game system 1 provides a player with various services related to a game through a network 2 (for example, the Internet and the like), and includes a server device 10 and a plurality of player terminals 20.

<<Configuration of Server Device 10>>

Figure 2:
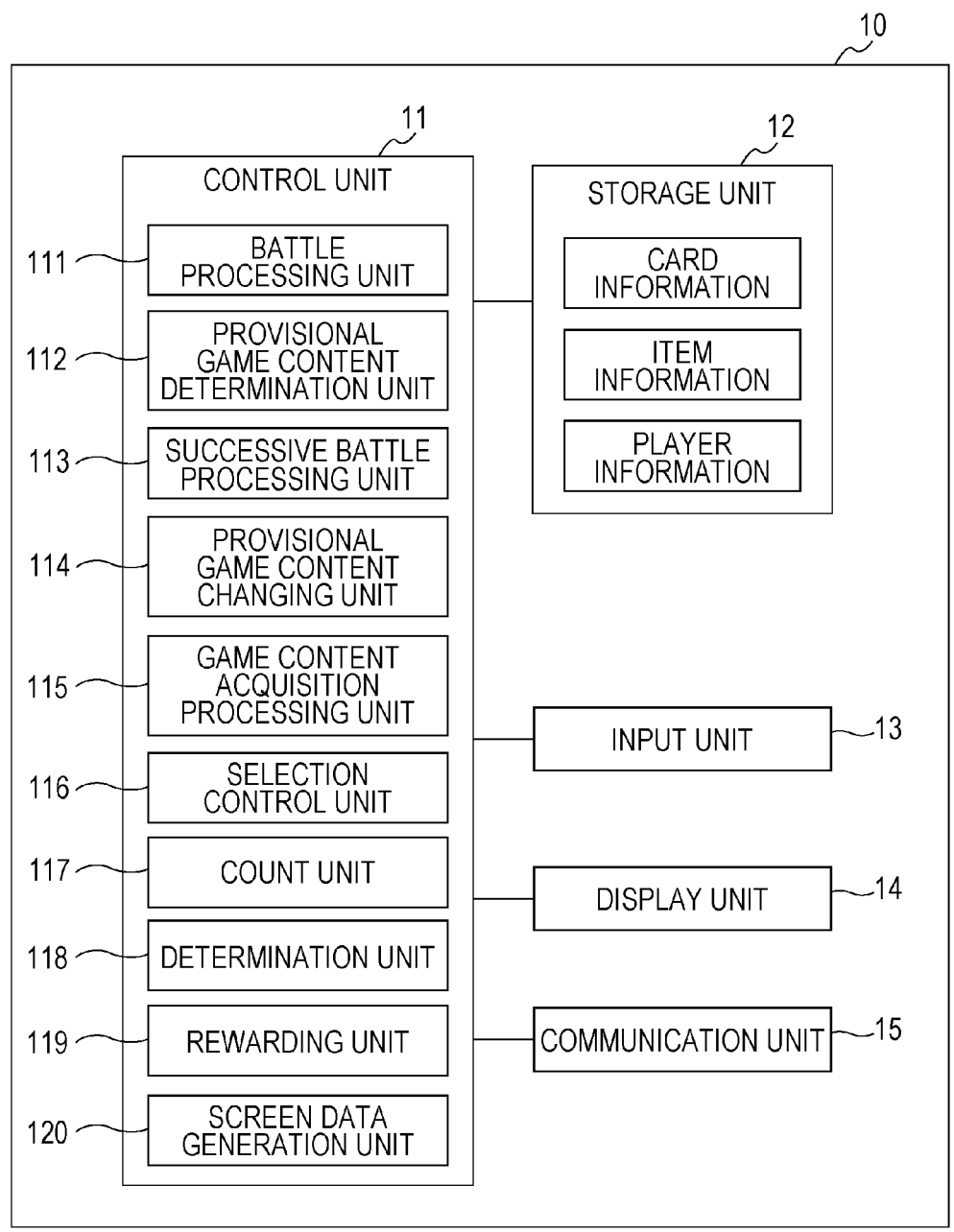
FIG. 2 is a block diagram illustrating a functional configuration of a server device.

FIG. 2 is a block diagram illustrating a functional configuration of the server device 10 according to the present embodiment. The server device 10 is an information processing device (for example, a workstation, a personal computer, and the like) used when a system administrator and the like manage the game service. The server device 10 can distribute (respond with) a game program operable on the player terminal 20, and a web page (game screen, and the like) made in a markup language (HTML, and the like) according to a specification of the player terminal 20 upon receiving various commands (requests) from the player terminal 20. The server device 10 includes a control unit 11, a storage unit 12, an input unit 13, a display unit 14, and a communication unit 15.

The control unit 11 performs data passing among units as well as controlling the entire server device 10, and is realized by a central processing unit (CPU) executing a program stored in a predetermined memory. The control unit 11 according to the present embodiment includes a battle processing unit 111, a provisional game content determination unit 112, a successive battle processing unit 113, a provisional game content changing unit 114, a game content acquisition processing unit 115, a selection control unit 116, a count unit 117, a determination unit 118, a rewarding unit 119, and a screen data generation unit 120.

The battle processing unit 111 includes a function to execute various processes related to a battle game. The battle processing unit 111 according to the present embodiment executes a process of determining win/loss of a battle game in response to a battle request from the player terminal 20.

The provisional game content determination unit 112 includes a function to execute a process of determining any of a plurality of game contents to be a provisional game content. The game content is an electronic game card, a figure or the like with which a character or the like is associated, or an item or the like such as a tool or ability that can be used in a game. The provisional game content is a game content that is provisionally given to a player. In other words, the provisional game content is a game content that can be but is not yet acquired by the player. The provisional game content determination unit 112 of the present embodiment determines any of a plurality of game cards as an example of the plurality of game contents to be a keep card as an example of the provisional game content that can be acquired by the player when it is determined that the player wins a battle game.

The successive battle processing unit 113 includes a function to execute various processes related to a successive battle game succeeding the battle game. The successive battle processing unit 113 of the present embodiment executes a process of determining win/loss of the successive battle game in response to a successive battle request from the player terminal 20. The successive battle processing unit 113 can also allow the player to repeatedly play the successive battle game within a predetermined time limit (such as ten minutes).

The provisional game content changing unit 114 includes a function to execute a process of changing the provisional game content determined by the provisional game content determination unit 112. The provisional game content changing unit 114 of the present embodiment determines a game content, to which rarity higher than or identical to that of the provisional game content determined by the provisional game content determination unit 112 is set, to be a provisional game content after change from among the plurality of game contents when it is determined that the player wins the successive battle game.

The game content acquisition processing unit 115 includes a function to execute a process of allowing the player to acquire (own) the provisional game content or the provisional game content after change. The game content acquisition processing unit 115 of the present embodiment determines the provisional game content determined by the provisional game content determination unit 112 to be the game content owned by the player (hereinafter also referred to as an "owned game content") when the acquisition request from the player terminal 20 is accepted after the provisional game content is determined, and determines the provisional game content after change being determined by the provisional game content changing unit 114 to be the owned game content when the acquisition request from the player terminal 20 is accepted after the provisional game content after change is determined.

The selection control unit 116 includes a function to execute a process of selectively controlling the process of acquiring a keep card performed by the game content acquisition processing unit 115 or the successive battle process performed by the successive battle processing unit 113. The selection control unit 116 of the present embodiment selectively allows the game content acquisition processing unit 115 to determine the provisional game content after change to be the owned game content in response to the acquisition request from the player terminal 20 or allows the successive battle processing unit 113 to determine win/loss of the successive battle game in response to the successive battle request from the player terminal 20 within a predetermined time limit, for example.

The count unit 117 includes a function to execute a process of counting the quantity, the number of times, the time and the like used in various processes. The count unit 117 of the present embodiment counts the elapsed time since the successive battle request from the player terminal 20 is accepted, for example.

The determination unit 118 includes a function to execute various determination processes. The determination unit 118 of the present embodiment determines whether or not the elapsed time counted by the count unit 117 has reached the predetermined time limit, for example.

The rewarding unit 119 includes a function to execute a process of giving a reward to the player. The rewarding unit 119 of the present embodiment rewards the player when the successive battle processing unit 113 determines that the player loses the successive battle game. Moreover, the rewarding unit 119 varies the reward to be given to the player according to the rarity of the provisional game content determined by the provisional game content determination unit 112.

The screen data generation unit 120 includes a function to execute a process of generating screen data used to display a game screen in the player terminal 20. The screen data generation unit 120 of the present embodiment generates HTML data as the screen data corresponding to the game screen.

The storage unit 12 includes a read only memory (ROM) that is a read only storage area in which a system program is stored, and a random access memory (RAM) that is a rewritable storage area used as a work area for arithmetic processing by the control unit 11. The storage unit 12 is, for example, realized by a non-volatile storage device, such as a flash memory or a hard disk. The storage unit 12 of the present embodiment stores at least card information related to a game card, item information related to a game item, and player information related to the player. Note that each of the information will be described in detail.

The input unit 13 is used by the system administrator and the like for inputting various data (for example, the card information and the like), and is realized by, for example, a keyboard, a mouse, and the like.

The display unit 14 is used for displaying an operation screen for the system administrator based on a command from the control unit 11, and is, for example, realized by a liquid crystal display (LCD) and the like.

The communication unit 15 is used for performing communication with the player terminal 20, and has a function as a reception unit that receives various data and signals transmitted from the player terminal 20, and a function as a transmission unit that transmits various data and signals to the player terminal 20 according to a command of the control unit 11. The communication unit 15 is, for example, realized by a network interface card (NIC), and the like.

<<Configuration of Player Terminal 20>>

Figure 3:
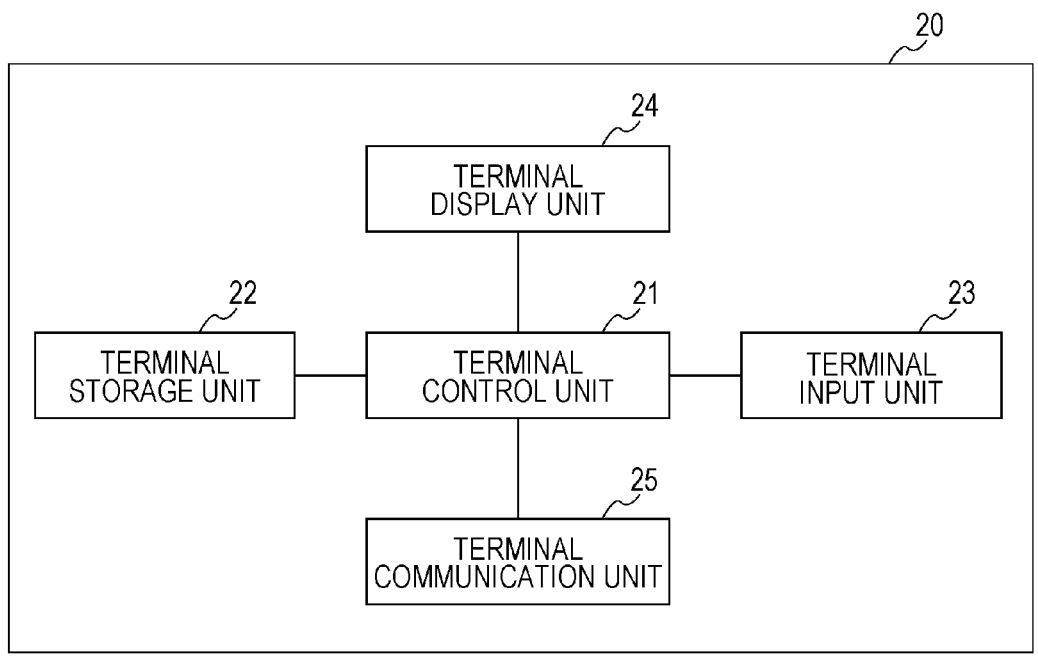
FIG. 3 is a block diagram illustrating a functional configuration of a player terminal.

FIG. 3 is a block diagram illustrating a functional configuration of the player terminal 20. The player terminal 20 of the present embodiment is an information processing device (for example, a mobile phone terminal, a smart phone, and the like) used by the player when playing a game, and can request distribution of various types of information (a game program, a web page, and the like) related to the game to the server device 10. Since the player terminal 20 has a web browser function for allowing the player to browse a web page, the web page (a game screen, and the like) distributed from the server device 10 can be displayed on a screen. The player terminal 20 includes a terminal control unit 21, a terminal storage unit 22, a terminal input unit 23, a terminal display unit 24, and a terminal communication unit 25.

The terminal control unit 21 performs data passing among units and controls the entire player terminal 20, and is realized by the central processing unit (CPU) executing a program stored in a predetermined memory. Note that the terminal control unit 21 of the present embodiment also functions as a screen display control unit that controls a display form of the game screen displayed in the terminal display unit 24. The terminal storage unit 22 is connected to the terminal control unit 21 through a bus, and performs processing of referring to, reading out, rewriting stored data according to a command from the terminal control unit 21. The terminal storage unit 22 is realized, for example, by a flash memory, a hard disk, and the like. The terminal input unit 23 is used for performing various operations (a game operation, and the like) by the player, and is realized, for example, by an operation button, a touch panel, and the like. The terminal display unit 24 is used to display a game screen according to a command from the terminal control unit 21 and is realized by a liquid crystal display (LCD), for example. The terminal communication unit 25 functions as a transmission/reception unit for performing transmission/ reception of various types of information with the server device 10 through the network 2, and is realized, for example, by a network interface card (NIC), and the like.

<<Data Structure>>

FIG. 4 is a diagram illustrating an example of a data structure of the card information stored in the storage unit 12 of the server device 10. The card information includes a field such as a card ID, a character name, a character image, rarity, initial attack strength, initial defense strength, and initial hit point (HP). The card ID corresponds to identification information by which a game card as an example of the game content is identified. The character name corresponds to information in which a display name of a character named by type is associated with each game card. The type of the character is specified by a numeric value assigned to the third digit of the card ID. A warrior character is set to a game card when the third digit of the card ID of the card is "0", for example. The character image corresponds to image data of a character. The rarity corresponds to a parameter indicating the rarity of a game card. The present embodiment sets any of four levels of rarity ("common", "uncommon", "rare", and "super rare") to a game card (a character). The rarity is specified by a numeric value assigned to the first digit of the card ID. The rarity "common" is set to a game card with the first digit of the card ID equal to "1", for example. Each of the initial attack strength, the initial defense strength, and the initial hit point of the character corresponds to a parameter indicating a performance value initially set to the character.

FIG. 5 is a diagram illustrating an example of a data structure of the item information stored in the storage unit 12 of the server device 10. The item information includes a field such as an item ID, an item name, and a price. The item ID corresponds to identification information by which an item is identified. The item name corresponds to information indicating a display name of the item. The price corresponds to information indicating a value of the item.

FIG. 6 is a diagram illustrating an example of a data structure of the player information stored in the storage unit 12 of the server device 10. The player information includes a field such as a player ID, virtual currency, a battle point, owned card information, owned item information, and deck information. The player ID is identification information that identifies the player. The virtual currency is an example of a game point and corresponds to information indicating the amount of virtual currency owned by the player. The player can purchase and possess the virtual currency. The battle point is an example of a spending parameter and is a parameter that is spent in fighting a battle against an enemy. In the present embodiment, the player can play the battle game and the successive battle game against the enemy by spending the spending parameter (decreasing the value in the spending parameter). In other words, it is set such that the player cannot battle the enemy when the spending parameter is running short. The number of clear victories corresponds to information indicating a cumulative value of the number of times the player has won a clear victory in the battle game. The number of clear victories kept corresponds to information indicating a cumulative value of the number of times the player has won a clear victory in the successive battle game within the time limit. The player wins a clear victory when a numeric value being calculated is greater than or equal to a predetermined value, the numeric value being the outcome of a predetermined calculation using a performance parameter of each of the player and the enemy in the battle. For example, the player wins a clear victory when the attack strength (a value of an attack strength parameter) of a game card owned by the player is twice or more than the defense strength (a value of a defense strength parameter) of a game card owned by the enemy. This means that the player wins by doing great damage to the enemy in the battle. The owned card information indicates a game card owned by the player (hereinafter also referred to as an "own card"). The owned item information indicates an item owned by the player (hereinafter also referred to as an "owned item"). The deck information is related to a deck. The deck is a card group including a plurality of game cards brought together into a single set.

FIG. 7 is a diagram illustrating an example of a data structure of the owned card information. The owned card information includes a field such as a card ID as well as attack strength, defense strength, hit point, and an acquired date and time of an owned card. The card ID corresponds to identification information by which the owned card is identified. Each of the attack strength, the defense strength, and the hit point of the owned card is a parameter indicating a performance value set to a character corresponding to the owned card. These various parameters are updated according to the outcome of a game or the like. The acquired date and time is a piece of information indicating a date and time when the player acquires the owned card.

FIG. 8 is a diagram illustrating an example of a data structure of the owned item information. The owned item information includes a field such as an item ID and the number of items owned. The item ID corresponds to identification information by which various items owned by the player are identified. The number of items owned is a piece of information indicating the number of items owned by the player.

FIG. 9 is a diagram illustrating an example of a data structure of the deck information. The deck information is a piece of information in which each of the plurality of game cards (card IDs), to which a consecutive number is assigned, is associated with rarity and flag information. The deck of the present embodiment includes a card group in which 100 game cards, to which the consecutive numbers from 1 to 100 are assigned, are arranged in order of the rarity, as illustrated in FIG. 9. A game card randomly selected from the deck by drawing is set as a keep card. Flag information "TRUE" is then set to the card ID of the keep card, whereas "FALSE" is set to the card ID of the rest of the game cards. The flag information is updated every time the keep card is changed. The deck information is also updated by reorganizing the card group constructing the deck when the acquisition of the keep card is settled or the time limit is reached.

<<Game Overview>>

Here, an outline of a game provided by the game system 1 of the present embodiment will be described. The game system 1 provides a variety of games played by using an electronic game card (a virtual card used in the game) to which a game character is associated.

<Battle Game>

The player in the game system 1 of the present embodiment can own a plurality of game cards. The player can then play a battle game by using a game card (a player character) selected from among the plurality of game cards owned. Once a character (an enemy character) to be an enemy of the player character is determined in the battle game, the win/loss of the battle between these characters is determined on the basis of various parameters set to each character (the attack strength, the defense strength, the hit point and the like).

Then, when it is determined that the player wins the battle game, a keep card set to be acquired by the player is generated (appears) in some cases on the basis of a predetermined drawing probability. The player can acquire the keep card being generated as his owned card or play a successive battle game succeeding the battle game without acquiring the keep card as the owned card. That is, the player can select to either acquire the keep card or challenge the successive battle game when the keep card is generated.

<Successive Battle Game>

In the game system 1 of the present embodiment where the keep card is generated in the aforementioned battle game, the player can play the successive battle game within the time limit by selecting to challenge the successive battle game. A new enemy character is determined in the successive battle game, and then win/loss of the battle game fought against the enemy character is determined.

When it is determined that the player wins the successive battle game, a game card, to which the rarity higher than or identical to that of the keep card generated as a result of the battle game is set, is set as a keep card after change. The player can acquire the keep card after change as his owned card or forgo acquiring the keep card after change and challenge a next successive battle game.

Accordingly, the player can repeatedly challenge a successive battle game in order to acquire a keep card with higher rarity while he continues to win within the time limit.

<<Operation of Game System 1>>

<Overall Operation>

Figure 10:
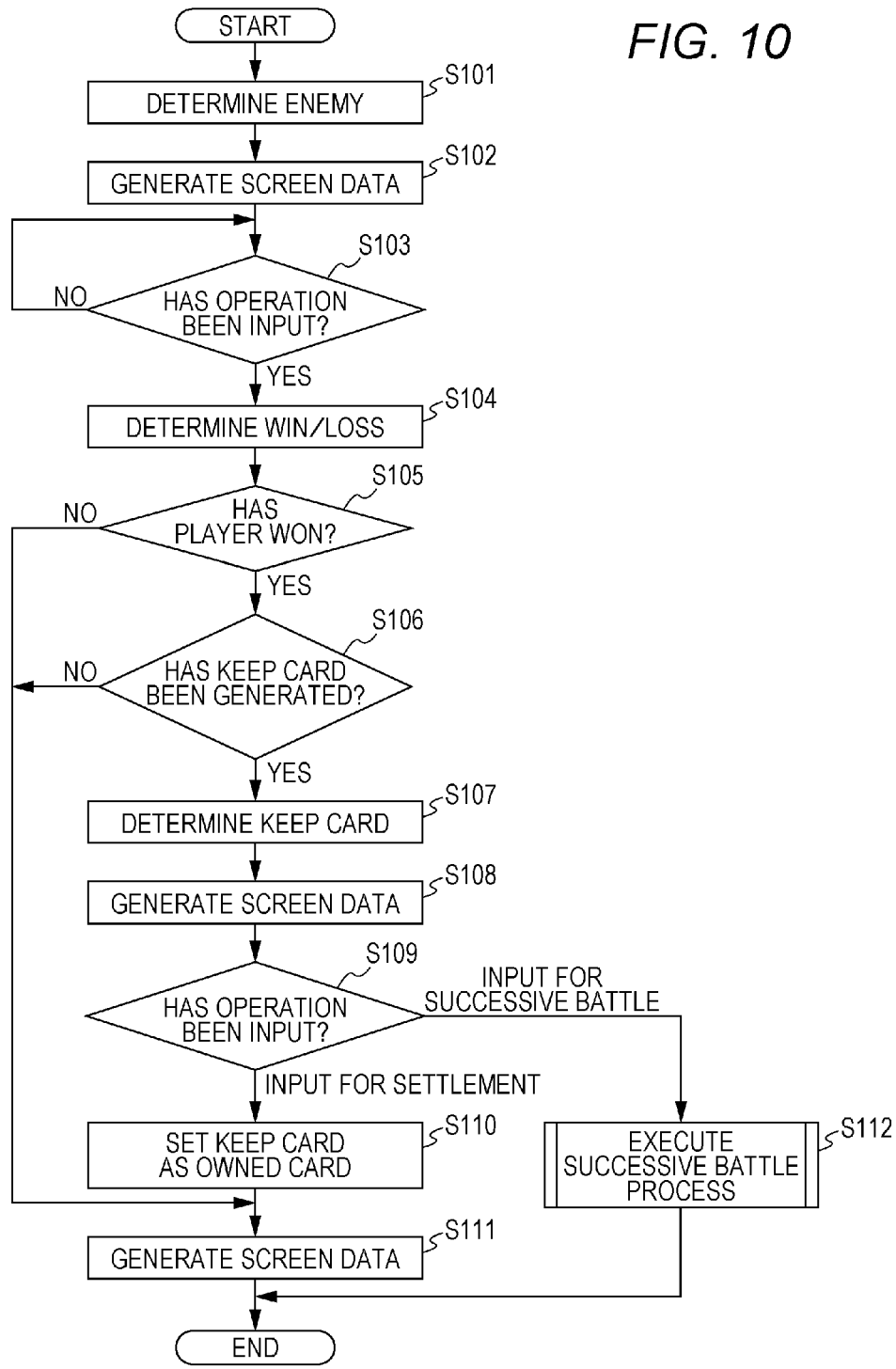
FIG. 10 is a flowchart illustrating an operation example of the game system.

FIG. 10 is a flowchart illustrating an operation example of the game system 1 according to the present embodiment.

Upon receiving an operational input of the player (such as a "player A") from the terminal input unit 23, the terminal control unit 21 of the player terminal 20 transmits a command requesting to start a battle game (a start battle request) to the server device 10 through the terminal communication unit 25.

The server device 10 having accepted the start battle request from the player terminal 20 then refers to the player information illustrated in FIG. 6 to match and determine an enemy of the player in the battle game (S101).

After determining the enemy of the player, the server device 10 causes the screen data generation unit 120 to generate the screen data (HTML data) used to display a battle game screen before battle in the player terminal 20 (S102). The server device 10 transmits the screen data (HTML data) generated by the screen data generation unit 120 to the requestor player terminal 20 through the communication unit 15.

Upon receiving the screen data (HTML data) transmitted from the server device 10, the player terminal 20 analyzes the screen data and displays a game screen corresponding to the screen data on the terminal display unit 24.

Figure 11:
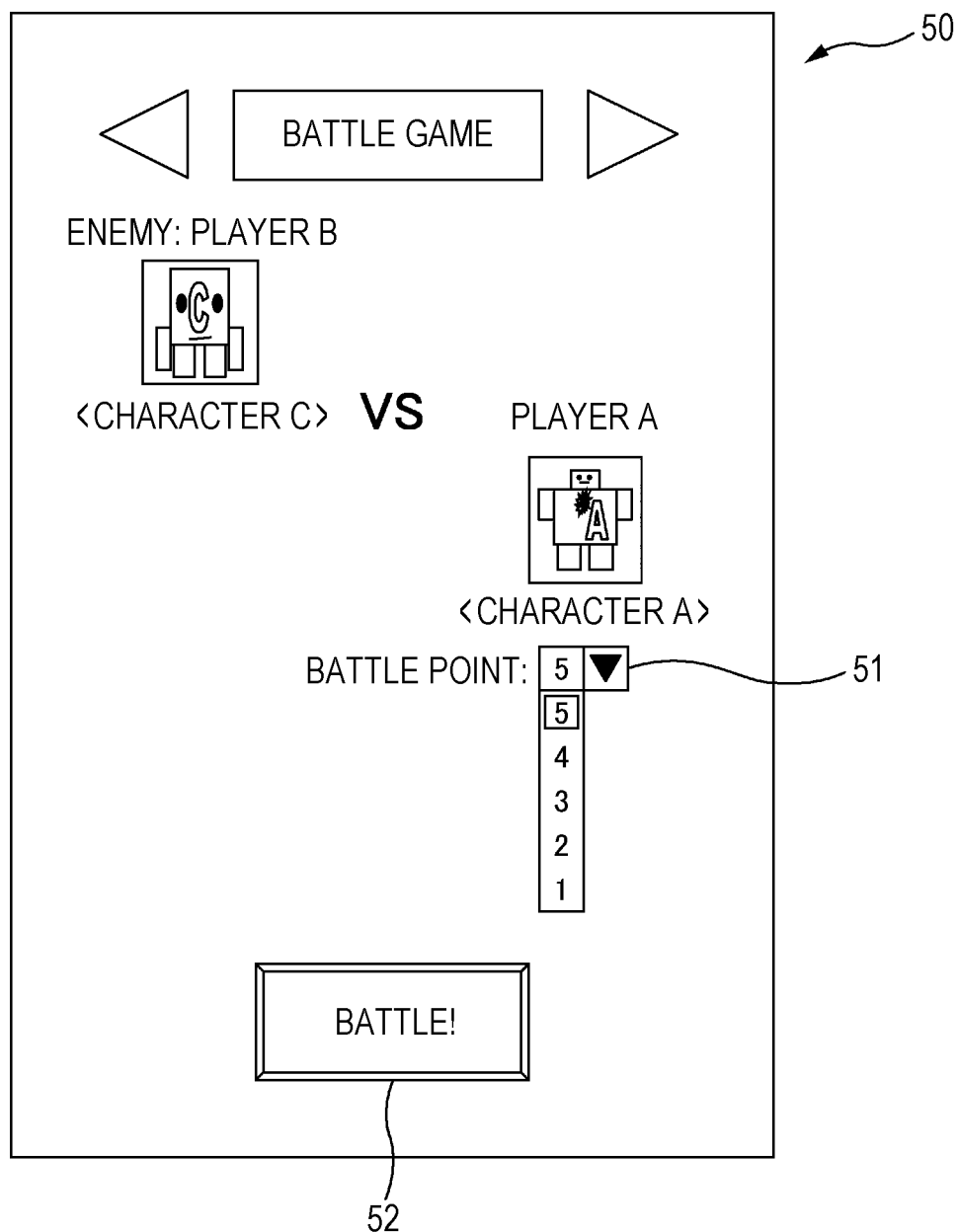
FIG. 11 is a diagram illustrating an example of a battle game screen before a battle.

FIG. 11 is a diagram illustrating an example of a battle game screen 50 displayed on the terminal display unit 24 before battle. The battle game screen 50 before battle indicates that a "player B" is determined as the enemy of the "player A" and that a "character A" (a player character) owned by the "player A" fights a battle against a "character C" (an enemy character) owned by the "player B". The "player A" operates a menu button 51 to select the amount of battle points to be spent (such as 5 points) from a selection field of a pull-down menu. The amount of battle points included in the selection field is extracted on the basis of the player information (refer to FIG. 6) stored in the storage unit 12. The "player A" then selects a battle button 52 after determining the amount of battle points.

Referring back to FIG. 10, the player terminal 20 determines whether or not such operational input has been performed by the player A (S103) and, when the operational input has been performed, transmits a command requesting to fight a battle by spending the battle point (a battle request) to the server device 10 through the terminal communication unit 25 on the basis of the operation information input by the player A.

The server device 10 having accepted the battle request transmitted from the player terminal 20 then executes a battle process to determine win/loss of the battle game (S104).

Specifically, the battle processing unit 111 spends (decreases) the battle point owned by the player A according to the amount of battle points selected by the player A by operating the menu button 51. At this time, the player information (refer to FIG. 6) related to the player A is updated.

The battle processing unit 111 then determines the attack strength of the character A (the player character) on the basis of the amount of the battle points spent. Here, the battle processing unit 111 sets greater attack strength to the greater amount of battle points being spent. The battle processing unit 111 thereafter calculates the magnitude of damage done to the character C by the character A on the basis of the attack strength parameter of the character A being determined and the defense strength parameter of the character C (enemy character) being the enemy, and decreases the hit point parameter of the character C in accordance with the magnitude of the damage. To the contrary, the battle processing unit 111 decreases the hit point parameter of the character A according to the attack by the character C. As a result, it is determined that the character A wins when the hit point parameter of the character C reaches "0" first and that the character A loses when the hit point parameter of the character A reaches "0" first.

Here, the determination unit 118 determines whether or not the character A wins a clear victory when the battle processing unit 111 determines that the player A wins. That is, the determination unit 118 determines whether or not the value of the attack strength parameter of the character A is twice or more than the value of the defense strength parameter of the character C who is the enemy. The character A wins the clear victory over the character C when the determination is affirmative. Then, the count unit 117 counts the victory when it is determined that the character A wins the clear victory and updates the number of clear victories included in the player information (refer to FIG. 6) related to the player A.

The battle processing unit 111 further performs a process of determining whether or not to generate a keep card that can be acquired by the player A on the basis of a predetermined drawing probability, when it is determined that the character A wins the battle game. At this time, the battle processing unit 111 refers to the player information illustrated in FIG. 6 and always determines to generate the keep card when the number of clear victories of the player A is greater than or equal to a predetermined number of times. Note that the number of clear victories of the player A is reset once it is determined to generate the keep card.

Next, the determination unit 118 of the server device 10 determines whether or not the battle processing unit 111 determines that the player A wins (S105). When it is determined that the player A loses (S105: NO), the screen data generation unit 120 generates a game screen indicating that the player A loses the battle game (S111). When it is determined that the player A wins (S105: YES), on the other hand, the determination unit 118 determines whether or not the battle processing unit 111 determines to generate the keep card (S106).

When the determination unit 118 determines that the keep card is determined to be not generated (S106: NO), the screen data generation unit 120 generates a game screen indicating that the player A wins the battle game (S111). When the determination unit 118 determines that the keep card is determined to be generated (S106: YES), on the other hand, the provisional game content determination unit 112 performs a process of determining the keep card (S107). That is, the provisional game content determination unit 112 refers to the player information illustrated in FIG. 6 and the deck information illustrated in FIG. 9 to determine a game card randomly selected from the deck assigned to the player A to be the keep card. The provisional game content determination unit 112 then sets the flag "TRUE" to the card ID of the keep card being determined in the deck information (refer to FIG. 9) of the player A.

After determining that the player wins the battle game and determining the keep card, the server device 10 causes the screen data generation unit 120 to generate screen data (HTML data) used to display a battle game screen after battle in the player terminal 20 (S108). The server device 10 then transmits the screen data (HTML data) generated by the screen data generation unit 120 to the requestor player terminal 20 through the communication unit 15.

Upon receiving the screen data (HTML data) transmitted from the server device 10, the player terminal 20 analyzes the screen data and displays a game screen corresponding to the screen data on the terminal display unit 24.

Figure 12:
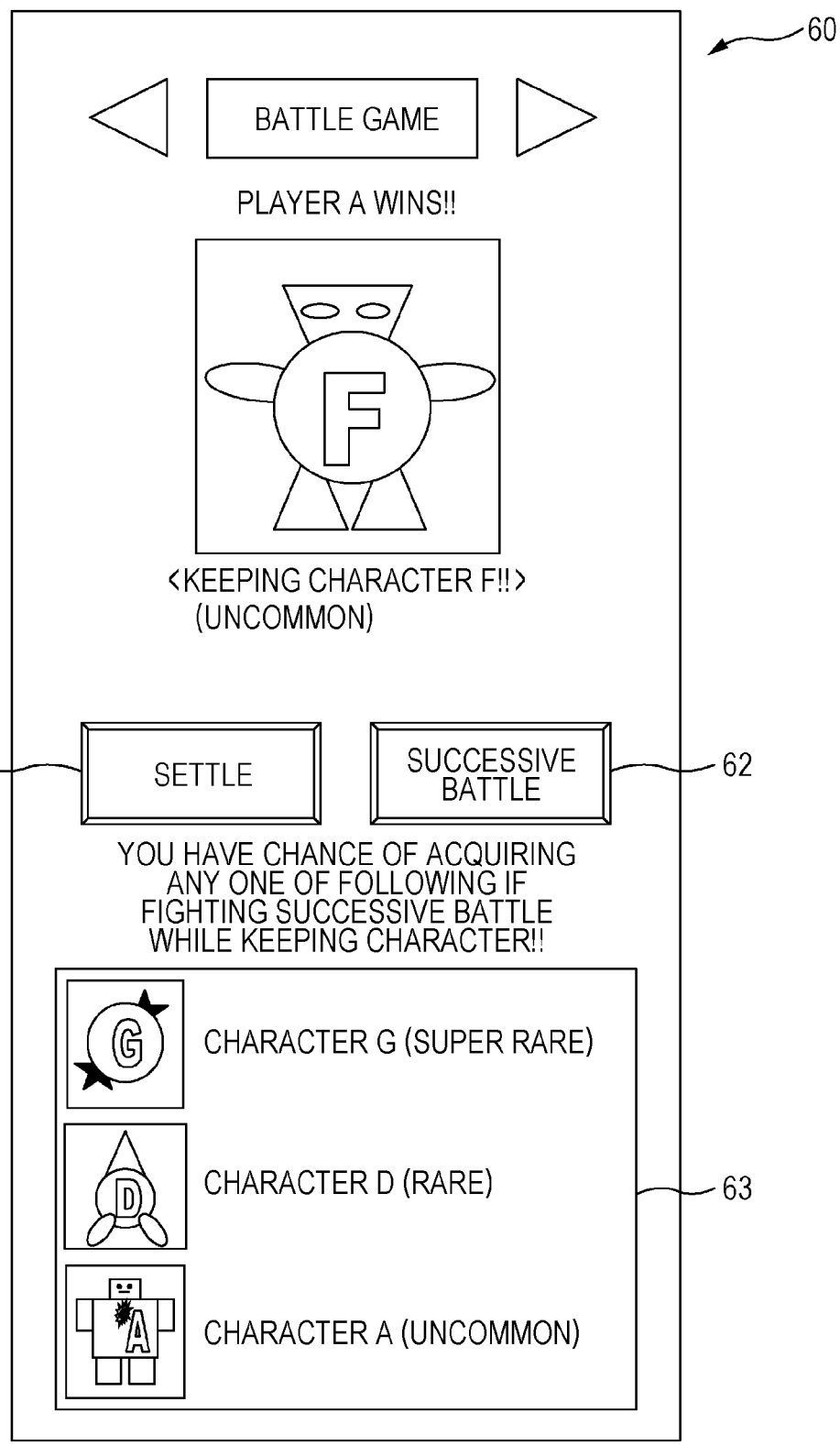
FIG. 12 is a diagram illustrating an example of a battle game screen after a battle.

FIG. 12 is a diagram illustrating an example of a battle game screen 60 displayed in the terminal display unit 24 after battle. The battle game screen 60 after battle indicates that the "player A" wins and that a game card of a "character F" (uncommon) is determined as the keep card. The battle game screen 60 after battle also includes a settlement button 61, a successive battle button 62, and keep card information 63. The settlement button 61 is provided to settle the acquisition of the "character F" (uncommon) determined as the keep card. The successive battle button 62 is provided to play the successive battle game succeeding the battle game without settling the acquisition of the "character F" (uncommon) at this point. The keep card information 63 is a piece of information indicating a game card that is possibly determined as a keep card after change when it is determined that the player wins the successive battle game.

Referring back to FIG. 10, the player terminal 20 determines whether or not the operational input is performed by the player A while the battle game screen 60 after battle is displayed in the terminal display unit 24 (S109) and transmits, to the server device 10, a command requesting to acquire the "character F" (an acquisition request) when the settlement button 61 is selected by the operation of the player A. On the other hand, the player terminal 20 transmits to the server device 10 a command requesting to play the successive battle game (a successive battle request) when the successive battle button 62 is selected by the operation of the player A.

Next, the server device 10 settles the acquisition of the keep card after accepting the acquisition request transmitted from the player terminal 20. That is, the game content acquisition processing unit 115 sets the "character F" determined as the keep card to be the owned card of the player A (S110). The owned card information illustrated in FIG. 7 is updated at this time.

Figure 13:
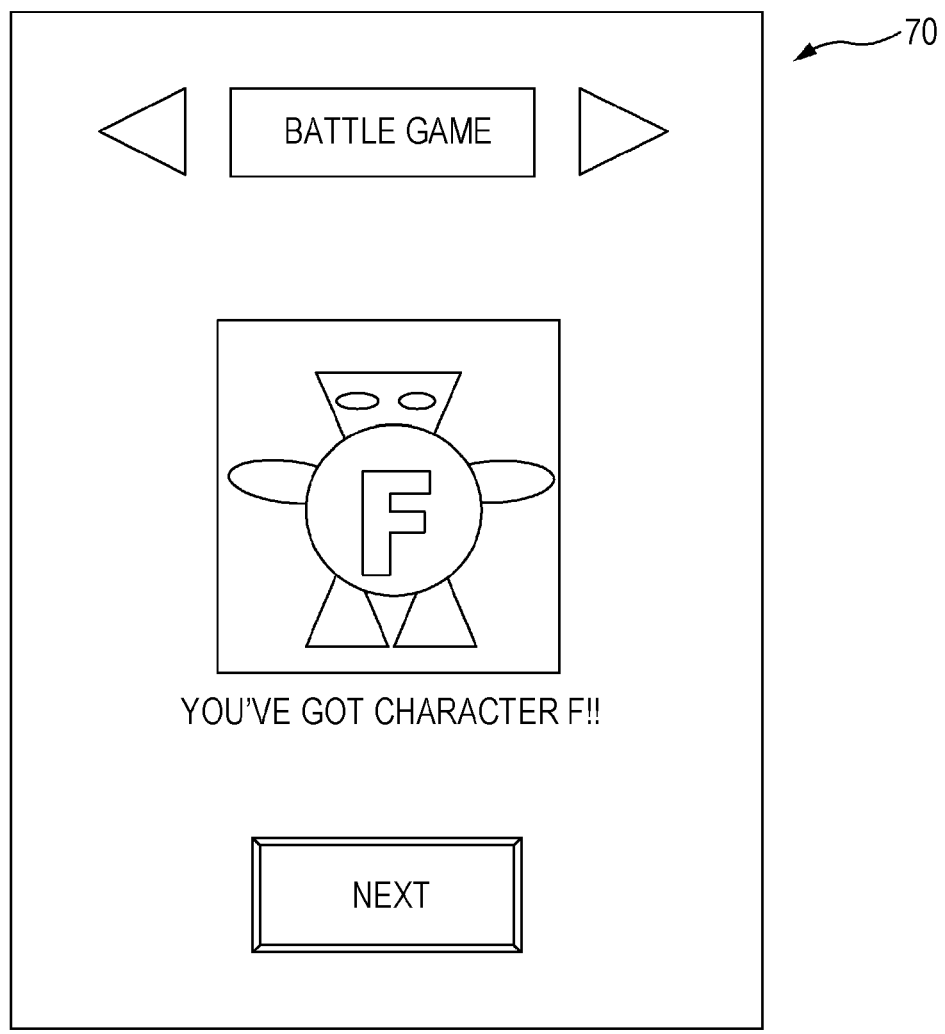
FIG. 13 is a diagram illustrating an example of a battle game screen after the acquisition of a keep card is settled.

Upon settling the acquisition of the keep card, the server device 10 causes the screen data generation unit 120 to generate screen data (HTML data) used to display a battle game screen 70 illustrated in FIG. 13 in the player terminal 20 (S111). The player A can confirm the acquisition of the "character F" being the keep card by checking the battle game screen 70 illustrated in FIG. 13 that is displayed in the player terminal 20.

On the other hand, the server device 10 causes the successive battle processing unit 113 to execute the successive battle process upon accepting the successive battle request transmitted from the player terminal 20 (S112). The successive battle process will be described in detail later on.

Accepting the acquisition request or the successive battle request transmitted from the player terminal 20, the server device 10 selectively controls the process of acquiring the keep card performed by the game content acquisition processing unit 115 or the successive battle process performed by the successive battle processing unit 113. That is, the selection control unit 116 selectively allows the game content acquisition processing unit 115 to determine the keep card to be the owned card of the player A or allows the successive battle processing unit 113 to determine win/loss of the successive battle game. This means that, once the player selects one of the acquisition of the keep card (an operation of the settlement button 61) and the challenge to the successive battle game (an operation of the successive battle button 62), he can no longer select another button.

<Operation Related to Successive Battle>

Figure 14:
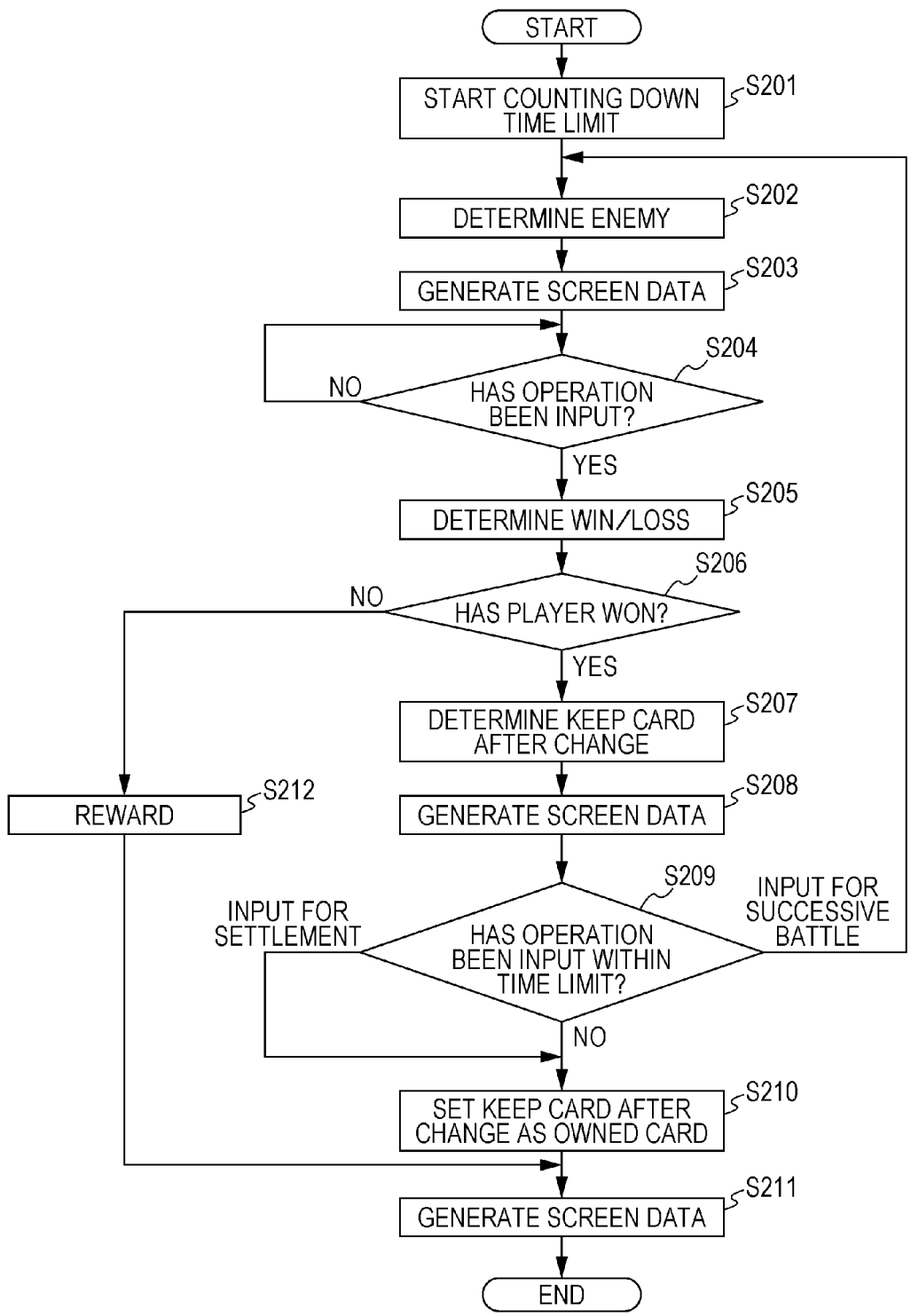
FIG. 14 is a flowchart illustrating a successive battle process.

FIG. 14 is a flowchart illustrating the successive battle process.

First, the server device 10 causes the count unit 117 to start counting the elapsed time since the successive battle request from the player terminal 20 is accepted (S201).

The server device 10 then refers to the player information illustrated in FIG. 6 to re-match and determine a new enemy of the player A in the successive battle game (S202).

After determining the new enemy of the player A, the server device 10 causes the screen data generation unit 120 to generate screen data (HTML data) used to display a successive battle game screen before battle in the player terminal 20 (S203). The server device 10 then transmits the screen data (HTML data) generated by the screen data generation unit 120 to the requestor player terminal 20 through the communication unit 15.

Upon receiving the screen data (HTML data) transmitted from the server device 10, the player terminal 20 analyzes the screen data and displays a game screen corresponding to the screen data on the terminal display unit 24. At this time, the terminal display unit 24 displays a successive battle game screen similar to the battle game screen 50 illustrated in FIG. 11.

Next, the player terminal 20 determines whether or not an operational input is performed by the player A while the successive battle game screen is displayed on the terminal display unit 24 (S204) and, when the operational input is performed, transmits a command requesting to fight a battle by spending the battle point (a successive battle request) to the server device 10 through the terminal communication unit 25 on the basis of operation information input by the player A.

The server device 10 executes the successive battle process to determine win/loss of the successive battle game after accepting the successive battle request transmitted from the player terminal 20 (S205).

Specifically, the successive battle processing unit 113 spends (decreases) the battle point owned by the player A according to the amount of battle points input by the operation of the player A. At this time, the player information (refer to FIG. 6) related to the player A is updated. The successive battle processing unit 113 then determines the attack strength of the player character on the basis of the amount of battle points spent. Here, the successive battle processing unit 113 sets greater attack strength to the greater amount of battle points being spent. The successive battle processing unit 113 thereafter calculates the magnitude of damage done to the enemy character by the player character on the basis of the attack strength parameter of the player character being determined and the defense strength parameter of the enemy character being the enemy, and decreases the hit point parameter of the enemy character in accordance with the magnitude of the damage. To the contrary, the battle processing unit 111 decreases the hit point parameter of the player character according to the attack by the enemy character. As a result, it is determined that the player character wins when the hit point parameter of the enemy character reaches "0" first and that the enemy character wins when the hit point parameter of the player character reaches "0" first.

Here, the determination unit 118 determines whether or not the win of the player character is a clear victory when the successive battle processing unit 113 determines that the player A wins. That is, the determination unit 118 determines whether or not the value of the attack strength parameter of the player character is twice or more than the value of the defense strength parameter of the enemy character by comparing the values. The player character wins the clear victory over the enemy character when the determination is affirmative. Then, the count unit 117 counts the victory when it is determined that the player character wins the clear victory, and updates the number of clear victories kept included in the player information (refer to FIG. 6) related to the player A.

Next, the determination unit 118 of the server device 10 determines whether or not the successive battle processing unit 113 determines that the player A wins (S206). When it is determined that the player A loses (S206: NO), a reward is given to the player A instead of the keep card he cannot acquire (S212). That is, the rewarding unit 119 refers to the item information illustrated in FIG. 5, selects a predetermined item, and gives the item to the player A as a reward. The owned item information (refer to FIG. 8) related to the player A is updated at this time. Moreover, the flag "TRUE" set to the card ID of the keep card is changed to "FALSE" in the deck information (refer to FIG. 9).

Here, the rewarding unit 119 varies the reward in accordance with the rarity of the keep card determined by the provisional game content determination unit 112. The rewarding unit 119 increases the number of predetermined items given to the player as the rarity of the keep card increases, for example.

Figure 16:
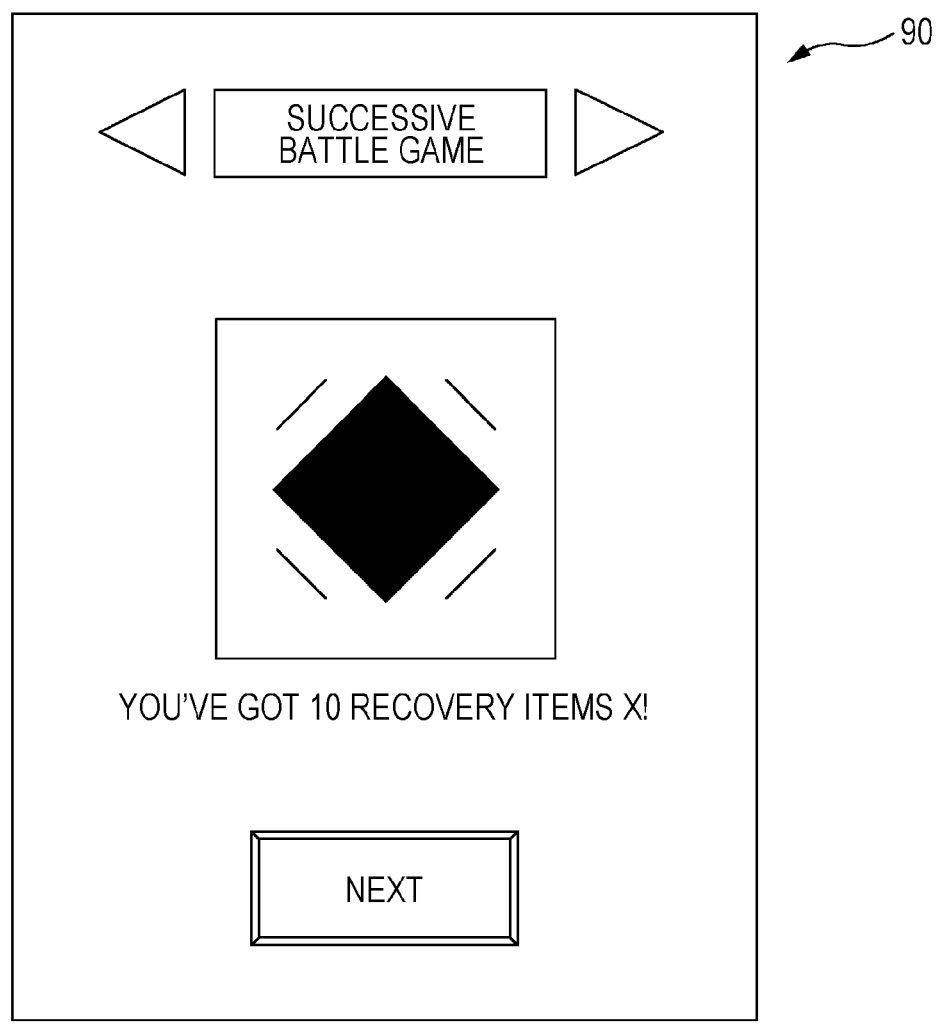
FIG. 16 is a diagram illustrating an example of a successive battle game screen when a reward is given.

The screen data generation unit 120 generates a successive battle game screen (refer to FIG. 16) indicating that the reward is given to the player A (S211) after the successive battle processing unit 113 determines that the player A loses and the reward is given to the rewarding unit 119.

When it is determined that the player A wins (S206: YES), on the other hand, the provisional game content changing unit 114 performs the process of changing the keep card determined by the provisional game content determination unit 112 (S207). Specifically, the provisional game content changing unit 114 first determines by drawing whether or not to change the keep card determined by the provisional game content determination unit 112. The provisional game content changing unit 114 keeps the keep card without changing it when it is determined to keep the keep card as a result of the drawing. When it is determined to change the keep card as a result of the drawing, on the other hand, the provisional game content changing unit 114 refers to the player information illustrated in FIG. 6 and the deck information illustrated in FIG. 9, selects a game card from the deck assigned to the player A to which the rarity higher than or identical to that of the keep card determined by the provisional game content determination unit 112 is set, and determines the game card as the keep card after change. Then, the provisional game content changing unit 114 updates the deck information (refer to FIG. 9) of the player A by setting the flag "TRUE" to the card ID of the keep card after change.

At this time, the provisional game content changing unit 114 refers to the player information illustrated in FIG. 6 and selects, from the deck assigned to the player A, a game card to which the rarity higher than that of the keep card determined by the provisional game content determination unit 112 is set (that is, the rarity is always increased) when the number of clear victories kept by the player A is greater than or equal to a predetermined number of times. Note that the number of clear victories kept by the player A is reset when the keep card after change is determined in the aforementioned manner.

After determining that the player wins the successive battle game and determining the keep card after change, the server device 10 causes the screen data generation unit 120 to generate screen data (HTML data) used to display a successive battle game screen after battle in the player terminal 20 (S208). The server device 10 then transmits the screen data (HTML data) generated by the screen data generation unit 120 to the requestor player terminal 20 through the communication unit 15.

Upon receiving the screen data (HTML data) transmitted from the server device 10, the player terminal 20 analyzes the screen data and displays a game screen corresponding to the screen data on the terminal display unit 24.

Figure 15:
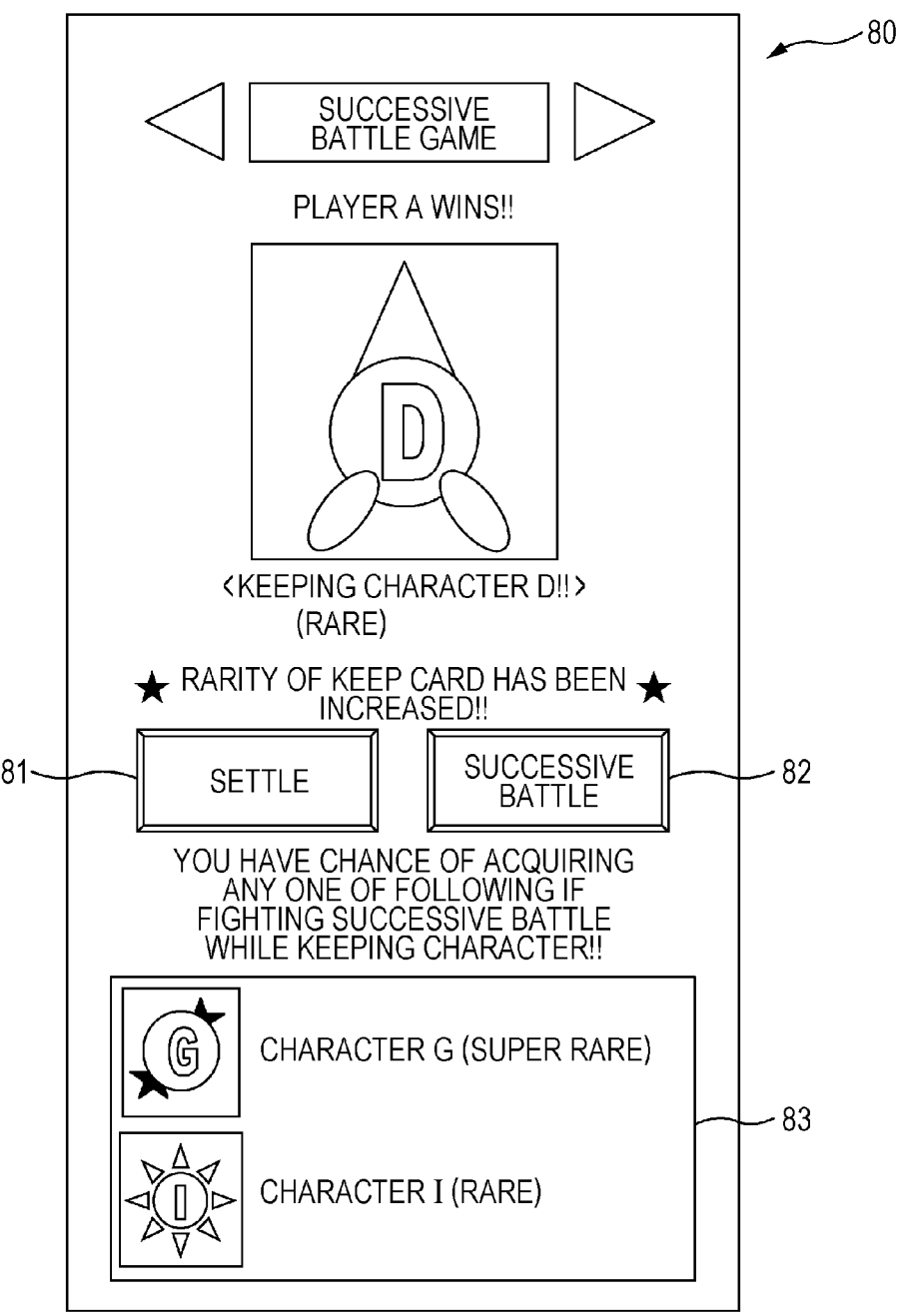
FIG. 15 is a diagram illustrating an example of a successive battle game screen after a battle.

FIG. 15 is a diagram illustrating an example of a successive battle game screen 80 displayed in the terminal display unit 24 after battle. The successive battle game screen 80 after battle indicates that the "player A" wins, the game card of a "character D" (rare) is determined as the keep card after change, and the rarity of the keep card after change is increased. The successive battle game screen 80 after battle further includes a settlement button 81, a successive battle button 82, and keep card information 83. The settlement button 81 is provided to settle the acquisition of the "character D" (rare) determined as the keep card after change. The successive battle button 82 is provided to play the successive battle game once again by forgoing the acquisition of the "character D" (rare). The keep card information 83 is a piece of information indicating a game card that is possibly determined as a keep card after change when the player wins the successive battle game played once again.

Referring back to FIG. 14, the player terminal 20 determines whether or not the operational input is performed by the player A within the time limit of the successive battle game (S209) and transmits, to the server device 10, a command requesting to acquire the "character D" after change (an acquisition request) when the settlement button 81 is selected by the operation of the player A. On the other hand, the player terminal 20 transmits to the server device 10 a command requesting to play the successive battle game (a successive battle request) when the successive battle button 82 is selected by the operation of the player A. When the elapsed time counted by the count unit 117 has reached the time limit and no operational input is performed until the time limit (S209: NO), the player terminal 20 transmits, in response to the time limit being reached, a command requesting to acquire the "character D" after change (an acquisition request) to the server device 10 not on the basis of the operational input from the player A.

Next, the server device 10 settles the acquisition of the keep card after accepting the acquisition request transmitted from the player terminal 20. That is, the game content acquisition processing unit 115 sets the "character D" determined as the keep card after change to be the owned card of the player A (S210). The owned card information illustrated in FIG. 7 is updated at this time.

Upon settling the acquisition of the keep card, the server device 10 causes the screen data generation unit 120 to generate screen data (HTML data) used to display a successive battle game screen similar to the battle game screen 70 illustrated in FIG. 13 in the player terminal 20 (S211). The player A can confirm the acquisition of the "character D" being the keep card after change by checking the successive battle game screen displayed in the player terminal 20.

On the other hand, the server device 10 returns to step S202 upon accepting the successive battle request transmitted from the player terminal 20, and refers to the player information illustrated in FIG. 6 to re-match and determine a new enemy of the player A in the successive battle game played once again. Accordingly, the successive battle processing unit 113 can repeatedly execute the successive battle process until the time limit of the successive battle game elapses.

Accepting the acquisition request or the successive battle request transmitted from the player terminal 20 within the time limit, the server device 10 selectively controls the process of acquiring the keep card after change performed by the game content acquisition processing unit 115 or the successive battle process performed by the successive battle processing unit 113. That is, the selection control unit 116 selectively allows the game content acquisition processing unit 115 to determine the keep card after change to be the owned card of the player A or allows the successive battle processing unit 113 to determine win/loss of the successive battle game. This means that, once the player selects one of the acquisition of the keep card after change (an operation of the settlement button 81) and the re-challenge to the successive battle game (an operation of the successive battle button 82), he can no longer select another button.

According to the game system 1 of the present embodiment where the keep card is generated in the battle game, the player can acquire the keep card or play the successive battle game succeeding the battle game in order to acquire the keep card with higher rarity. As a result, there is a higher possibility of acquiring the keep card with higher rarity every time a battle is repeatedly fought, thereby increasing the expectation of the player with regards to the acquisition of the game card.

Other Embodiments

The above-described embodiments have been given for easy understanding of the present invention, and are not used to construe the present invention in a limited manner. The present invention can be changed and improved without departing from the gist of the invention and includes its equivalents. Especially, embodiments described below are also included in the present invention.

<Number of Clear Victories/Number of Clear Victories Kept>

The aforementioned embodiments have illustrated the case where it is determined to always generate the keep card when the number of clear victories is greater than or equal to the predetermined number of times. Also illustrated is the case where the keep card is always changed to the game card with high rarity when the number of clear victories kept is greater than or equal to the predetermined number of times. The present invention may however be modified as follows.

Specifically, one point is counted regarding that the player wins a clear victory when the difference between the numeric value of the attack strength parameter of the player character and the numeric value of the defense strength parameter of the enemy character is greater than or equal to a fixed value. The difference equals 600 where the fixed value is 300, the attack strength parameter of the player character is 1000, and the defense strength parameter of the enemy character is 400, for example, whereby two points are counted. It may then be determined to always generate the keep card or always change to the keep card with high rarity when the point is accumulated to the maximum points (such as ten points).

<Time Limit>

In the aforementioned embodiments, the predetermined time limit may be further extended when the provisional game content changing unit 114 determines the game card, to which the rarity identical to that of the keep card determined by the provisional game content determination unit 112 is set, to be the keep card after change.

<Changing Keep Card>

In the aforementioned embodiments, the provisional game content changing unit 114 may always determine the game card, to which the rarity higher than that of the keep card determined by the provisional game content determination unit 112 is set, as the keep card after change when the player wins the successive battle game for a predetermined number of times or more in a row within the time limit.

When the game card with the highest rarity is determined as the keep card after change in the aforementioned embodiments, the provisional game content changing unit 114 may immediately settle the acquisition of the keep card (automatically) without waiting for the operational input of the settlement button 81 by the player.

<Automatic Selection>

When it is determined to generate the keep card or when the keep card after change is determined in the aforementioned embodiments, it may be automatically selected to acquire the keep card (the keep card after change) or challenge the successive battle game not by means of the operation of the player. The control unit 11 records beforehand the rarity specified by the operation of the player in the storage unit 12, for example. The control unit 11 then compares the rarity of the keep card determined by the provisional game content determination unit 112 with the preregistered rarity when it is determined to generate the keep card, and automatically sets the keep card to be the owned card of the player when the two rarities correspond. On the other hand, the successive battle game is automatically executed when the two rarities do not correspond.

<Server Device>

In the above-described present embodiments, the game system 1 provided with one server device 10 as an example of a server device has been exemplarily described. However, the game system 1 is not limited to this example, and may be provided with a plurality of server devices 10 as an example of the server device. That is, a plurality of server devices 10 is connected through a network 2, and each of the server devices 10 may perform various types of processing in a distributed manner. Note that the server device 10 is an example of a computer.

<Information Processing Device>

In the above-described game system 1 in the present embodiments, a case has been exemplarily described, in which various types of processing are executed based on a game program by the server device 10 and the player terminal 20 in cooperation with each other. However, the game system 1 is not limited to the example. The above-described various types of processing may be executed by the player terminal 20 alone or by the server device 10 alone as an information processing device based on the game program.

Further, it may be configured such that the player terminal 20 bares a part of the functions as the information processing device. In this case, the server device 10 and the player terminal 20 constitute the information processing device.

Note that the server device 10 is an example of a computer.

What is claimed is:

1. A server device which is connected to a player terminal used by a player through a network, the server device comprising:
   a storage unit which stores a plurality of game contents to which rarity is set, wherein the plurality of game contents are electronic game cards;
   a battle processing unit which determines win/loss of a battle game in response to a battle request from the player terminal;
   a provisional game content determination unit which determines any of the plurality of game contents to be a provisional game content that can be acquired by the player when it is determined that the player wins the battle game, wherein the provisional game content is an electronic game card from the plurality of game contents;
   a successive battle processing unit which determines win/loss of a successive battle game succeeding the battle game in response to a successive battle request from the player terminal after the provisional game content is determined;
   a provisional game content changing unit which determines a game content, to which rarity higher than or identical to that of the provisional game content is set, to be a provisional game content after change from among the plurality of game contents when it is determined that the player wins the successive battle game;
   a game content acquisition processing unit which determines the provisional game content determined by the provisional game content determination unit to be an owned game content owned by the player when an acquisition request from the player terminal is accepted after determining the provisional game content, and determines the provisional game content after change determined by the provisional game content changing unit to be the owned game content owned by the player when an acquisition request from the player terminal is accepted after determining the provisional game content after change; and
   a selection control unit which selectively allows the game content acquisition processing unit to determine the provisional game content after change to be the owned game content in response to the acquisition request from the player terminal or allows the successive battle processing unit to determine win/loss of the successive battle game in response to the successive battle request from the player terminal, within a predetermined time limit.

2. A server device which is connected to a player terminal used by a player through a network, the server device comprising:
   a storage unit which stores a plurality of game contents to which rarity is set, wherein the plurality of game contents are electronic game cards;
   a battle processing unit which determines win/loss of a battle game in response to a battle request from the player terminal;
   a provisional game content determination unit which determines any of the plurality of game contents to be a provisional game content that can be acquired by the player when it is determined that the player wins the battle game, wherein the provisional game content is an electronic game card from the plurality of game contents;
   a successive battle processing unit which determines win/loss of a successive battle game succeeding the battle game in response to a successive battle request from the player terminal after the provisional game content is determined;

a provisional game content changing unit which determines a game content, to which the rarity higher than or identical to that of the provisional game content is set, to be a provisional game content after change from among the plurality of game contents when it is determined that the player wins the successive battle game;

a game content acquisition processing unit which determines the provisional game content determined by the provisional game content determination unit to be an owned game content owned by the player when an acquisition request from the player terminal is accepted after determining the provisional game content, and determines the provisional game content after change determined by the provisional game content changing unit to be the owned game content owned by the player when an acquisition request from the player terminal is accepted after determining the provisional game content after change;

a count unit which counts elapsed time since the successive battle request from the player terminal is accepted; and a determination unit which determines whether or not the elapsed time counted by the count unit has reached a predetermined time limit, wherein the game content acquisition processing unit determines the provisional game content after change, being determined by the provisional game content changing unit, to be the owned game content owned by the player when the determination made by the determination unit is affirmative.

3. A server device which is connected to a player terminal used by a player through a network, the server device comprising:

a storage unit which stores a plurality of game contents to which rarity is set, wherein the plurality of game contents are electronic game cards;

a battle processing unit which determines win/loss of a battle game in response to a battle request from the player terminal;

a provisional game content determination unit which determines any of the plurality of game contents to be a provisional game content that can be acquired by the player when it is determined that the player wins the battle game, wherein the provisional game content is an electronic game card from the plurality of game contents;

a successive battle processing unit which determines win/loss of a successive battle game succeeding the battle game in response to a successive battle request from the player terminal after the provisional game content is determined;

a provisional game content changing unit which determines a game content, to which the rarity higher than or identical to that of the provisional game content is set, to be a provisional game content after change from among the plurality of game contents when it is determined that the player wins the successive battle game;

a game content acquisition processing unit which determines the provisional game content determined by the provisional game content determination unit to be an owned game content owned by the player when an acquisition request from the player terminal is accepted after determining the provisional game content, and determines the provisional game content after change determined by the provisional game content changing unit to be the owned game content owned by the player when an acquisition request from the player terminal is accepted after determining the provisional game content after change; and a rewarding unit which gives a reward to the player when the successive battle processing unit determines that the player loses the successive battle game.

4. The server device according to claim 3, wherein the rewarding unit varies the reward to be given to the player according to the rarity of the provisional game content that is determined by the provisional game content determination unit.

5. A server device which is connected to a player terminal used by a player through a network, the server device comprising:

a storage unit which stores a plurality of game contents to which rarity is set, wherein the plurality of game contents are electronic game cards;

a battle processing unit which determines win/loss of a battle game in response to a battle request from the player terminal;

a provisional game content determination unit which determines any of the plurality of game contents to be a provisional game content that can be acquired by the player when it is determined that the player wins the battle game, wherein the provisional game content is an electronic game card from the plurality of game contents;

a successive battle processing unit which determines win/loss of a successive battle game succeeding the battle game in response to a successive battle request from the player terminal after the provisional game content is determined;

a provisional game content changing unit which determines a game content, to which the rarity higher than or identical to that of the provisional game content is set, to be a provisional game content after change from among the plurality of game contents when it is determined that the player wins the successive battle game;

a game content acquisition processing unit which determines the provisional game content determined by the provisional game content determination unit to be an owned game content owned by the player when an acquisition request from the player terminal is accepted after determining the provisional game content, and determines the provisional game content after change determined by the provisional game content changing unit to be the owned game content owned by the player when an acquisition request from the player terminal is accepted after determining the provisional game content after change; and a screen data generation unit which generates a game screen before the win/loss of the successive battle game is determined by the successive battle processing unit, the game screen including information pertaining to a game content that is possibly determined to be the provisional game content after change by the provisional game content changing unit.

6. A non-transitory computer-readable storage medium storing a game program which causes a computer to execute:

a process of storing, in a storage unit, a plurality of game contents to which rarity is set, wherein the plurality of game contents are electronic game cards;

a battle process of determining win/loss of a battle game in response to a battle operation from a player;

a provisional game content determination process of determining any of the plurality of game contents to be a provisional game content that can be acquired by the player when it is determined that the player wins the battle game, wherein the provisional game content is an electronic game card from the plurality of game contents;

a successive battle process of determining win/loss of a successive battle game succeeding the battle game in response to a successive battle operation from the player after the provisional game content is determined;

a provisional game content changing process of determining a game content, to which the rarity higher than or identical to that of the provisional game content is set, to be a provisional game content after change from among the plurality of game contents when it is determined that the player wins the successive battle game;

a game content acquisition process of determining the provisional game content determined in the provisional game content determination process to be an owned game content owned by the player when an acquisition operation from the player is accepted after determining the provisional game content, and determining the provisional game content after change determined in the provisional game content changing process to be the owned game content owned by the player when an acquisition operation from the player is accepted after determining the provisional game content after change; and a selection control process of selectively allowing the game content acquisition process to determine the provisional game content after change to be the owned game content in response to the acquisition operation from the player or allowing the successive battle process to determine win/loss of the successive battle game in response to the successive battle operation from the player, within a predetermined time limit.

7. A non-transitory computer-readable storage medium storing a game program which causes a computer to execute:

a process of storing, in a storage unit, a plurality of game contents to which rarity is set, wherein the plurality of game contents is an electronic game card;

a battle process of determining win/loss of a battle game in response to a battle operation from a player;

a provisional game content determination process of determining any of the plurality of game contents to be a provisional game content that can be acquired by the player when it is determined that the player wins the battle game, wherein the provisional game content is an electronic game card from the plurality of game contents;

a successive battle process of determining win/loss of a successive battle game succeeding the battle game in response to a successive battle operation from the player after the provisional game content is determined;

a provisional game content changing process of determining a game content, to which the rarity higher than or identical to that of the provisional game content is set, to be a provisional game content after change from among the plurality of game contents when it is determined that the player wins the successive battle game;

a game content acquisition process of determining the provisional game content determined in the provisional game content determination process to be an owned game content owned by the player when the acquisition operation from the player is accepted after determining the provisional game content, and determining the provisional game content after change determined in the provisional game content changing process to be the owned game content owned by the player when the acquisition operation from the player is accepted after determining the provisional game content after change;

a count process of counting elapsed time since the successive battle operation from the player is accepted; and a determination process of determining whether or not the elapsed time counted in the count process has reached a predetermined time limit, wherein the game content acquisition process determines the provisional game content after change, being determined in the provisional game content changing process, to be the owned game content owned by the player when the determination made in the determination process is affirmative.

8. A non-transitory computer-readable storage medium storing a game program which causes a computer to execute:

a process of storing, in a storage unit, a plurality of game contents to which rarity is set, wherein the plurality of game contents are electronic game cards;

a battle process of determining win/loss of a battle game in response to a battle operation from a player;

a provisional game content determination process of determining any of the plurality of game contents to be a provisional game content that can be acquired by the player when it is determined that the player wins the battle game, wherein the provisional game content is an electronic game card from the plurality of game contents;

a successive battle process of determining win/loss of a successive battle game succeeding the battle game in response to a successive battle operation from the player after the provisional game content is determined;

a provisional game content changing process of determining a game content, to which the rarity higher than or identical to that of the provisional game content is set, to be a provisional game content after change from among the plurality of game contents when it is determined that the player wins the successive battle game;

a game content acquisition process of determining the provisional game content determined in the provisional game content determination process to be an owned game content owned by the player when an acquisition operation from the player is accepted after determining the provisional game content, and determining the provisional game content after change determined in the provisional game content changing process to be the owned game content owned by the player when an acquisition operation from the player is accepted after determining the provisional game content after change; and a rewarding process of giving a reward to the player when the successive battle process determines that the player loses the successive battle game.

9. The non-transitory computer-readable storage medium storing a game program according to claim 8, wherein the rewarding process varies the reward to be given to the player according to the rarity of the provisional game content that is determined in the provisional game content determination process.

10. A non-transitory computer-readable storage medium storing a game program which causes a computer to execute:

a process of storing, in a storage unit, a plurality of game contents to which rarity is set, wherein the plurality of game contents are electronic game cards;

a battle process of determining win/loss of a battle game in response to a battle operation from a player;

a provisional game content determination process of determining any of the plurality of game contents to be a provisional game content that can be acquired by the player when it is determined that the player wins the battle game, wherein the provisional game content is an electronic game card from the plurality of game contents;

a successive battle process of determining win/loss of a successive battle game succeeding the battle game in response to a successive battle operation from the player after the provisional game content is determined;

a provisional game content changing process of determining a game content, to which the rarity higher than or identical to that of the provisional game content is set, to be a provisional game content after change from among the plurality of game contents when it is determined that the player wins the successive battle game;

a game content acquisition process of determining the provisional game content determined in the provisional game content determination process to be an owned game content owned by the player when an acquisition operation from the player is accepted after determining the provisional game content, and determining the provisional game content after change determined in the provisional game content changing process to be the owned game content owned by the player when an acquisition operation from the player is accepted after determining the provisional game content after change; and a screen data generation process of generating a game screen before the win/loss of the successive battle game is determined in the successive battle process, the game screen including information pertaining to a game content that is possibly determined to be the provisional game content after change in the provisional game content changing process.

* * * * *